United States Patent
De Datta et al.

(10) Patent No.: US 8,949,254 B1
(45) Date of Patent: Feb. 3, 2015

(54) ENHANCING THE CONTENT AND STRUCTURE OF A CORPUS OF CONTENT

(75) Inventors: Raj K. De Datta, Palo Alto, CA (US);
Ashutosh Garg, Sunnyvale, CA (US);
Joshua Levy, Mountain View, CA (US);
Praveen K. Patnala, Santa Clara, CA (US); Srinath Sridhar, Mountain View, CA (US); William Uppington, San Mateo, CA (US); Abhay Vardhan, Redwood City, CA (US)

(73) Assignee: BloomReach Inc., Mountain View, CA (US)

( * ) Notice: Subject to any disclaimer, the term of this patent is extended or adjusted under 35 U.S.C. 154(b) by 0 days.

(21) Appl. No.: 12/916,309

(22) Filed: Oct. 29, 2010

(51) Int. Cl.
*G06F 17/00* (2006.01)
*G06F 17/30* (2006.01)

(52) U.S. Cl.
USPC ........................................................ 707/751

(58) Field of Classification Search
USPC ............ 707/55, 708, 803, 999.006, 707, 709, 707/710, 736, 750, 751; 709/202, 203
See application file for complete search history.

(56) References Cited

U.S. PATENT DOCUMENTS

| | | | |
|---|---|---|---|
| 7,653,654 B1 * | 1/2010 | Sundaresan | 709/219 |
| 8,135,706 B2 * | 3/2012 | Yu et al. | 707/722 |
| 8,762,382 B2 * | 6/2014 | Harrison et al. | 707/741 |
| 2010/0036828 A1 * | 2/2010 | Carmel et al. | 707/5 |

* cited by examiner

Primary Examiner — Marc Filipczyk
(74) Attorney, Agent, or Firm — Van Pelt, Yi & James LLP (57) ABSTRACT

Techniques for enhancing content are disclosed. In some embodiments, enhancing content includes automatically identifying a set of modifications to the existing content of a page that would result in the page satisfying a set of search properties and applying at least a subset of the set of modifications to the page. Furthermore, techniques for enhancing link structure are disclosed. In some embodiments, enhancing link structure includes automatically determining a constrained link structure for a set of pages that satisfies a set of one or more constraints and that is at least in part different from an existing link structure of the set of pages and making one or more modifications to the existing link structure to at least in part realize the constrained link structure for the set of pages.

47 Claims, 6 Drawing Sheets

ENHANCING THE CONTENT AND STRUCTURE OF A CORPUS OF CONTENT

BACKGROUND OF THE INVENTION

Various techniques for adding dynamic content, e.g., via JavaScript, to a web page exist. Such content of a web page, however, is not crawlable or searchable and thus cannot be used by search engines to retrieve and/or rank the web page.

Website owners typically rely on SEO (Search Engine Optimization) consultants to optimize their websites and/or associated web pages to make them more amenable for search engine retrieval and/or ranking Such SEO consultants manually modify the content and/or structures of websites so that the websites and/or associated web pages can be better located by users and search engines.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A website is typically comprised of a set of interconnected web pages. A web page is comprised of content of any of a variety of different types. The content of a web page may include content that is searchable, for example, by a search engine. The content of a web page may also include one or more hyperlinks that provide navigation to other web pages and/or resources. The structure of a website is defined by the hierarchical organization of web pages comprising the website as well as the links existing between pages of the website. It may be desirable to enhance the content and/or structure of a website, for example, to improve the discoverability of the website and to provide web pages with more relevant information. Various techniques for automatically modifying the content and/or structure of a website are disclosed. Although some of the given examples are described with respect to web pages of a website, the techniques disclosed herein may be employed with respect to any other organization of a corpus of content whose content and/or structure is desired to be improved.

Numerous factors may affect the discoverability of a website and its associated web pages. In some cases, key content associated with a page may not be searchable. At least some of the content of a page may be dynamically generated and provided with a page, e.g., via a JavaScript widget, in response to a user request for the page. For instance, some of the dynamic content of a page may be generated client-side, e.g., by a web browser. Although dynamic content may be relevant to searches, it is typically not crawlable by search engines. Server-side static content associated with a page may be searchable, but many issues may also arise with respect to the searchable content of a page. For example, the discoverability of the content of a page may be affected by language usage, especially if important content of the page fails to encompass variations that may instead be used to search for or otherwise locate the content. For instance, the content of a page may not include all or at least a relevant subset of synonyms of important keywords, terms, or phrases (e.g., table vs. desk); colloquial variations (e.g., cell phone vs. mobile phone); spelling variations (e.g., Hanukkah vs. Chanukah); geographical variations (e.g., Silicon Valley vs. Bay Area); etc. Moreover, content may not be presented in a manner that is conducive to searches and/or user navigation. The anchor text comprising a hyperlink provides a concise representation of the page or resource to which it points and if not selected properly may, for example, implicate the click rate of the hyperlink by users and/or hinder discoverability or ranking of the associated page or resource by search engines that index a page at least in part based on the anchor text of inlinks to the page. Furthermore, a fragmented distribution or organization of content across the pages comprising a website may result in the website content not satisfying common search terms or queries. For example, a restaurant website that indicates on a home or main page that the restaurant serves Japanese food and a San Francisco address but that has on another page a menu that includes sushi may not be provided or at least highly ranked as a search result in response to a user query for "sushi San Francisco". The discoverability of a page may also be affected by the manner in which the page is linked to other pages. For example, a page may not be easily accessible by a search engine or a user if it is too deeply buried or nested within the page hierarchy of a website. The techniques described herein enhance the discoverability of a website and its associated pages as well as make the website and its associated pages more amenable to various third party services by providing richer content on pages and/or improved navigation to pages.

Figure 1:
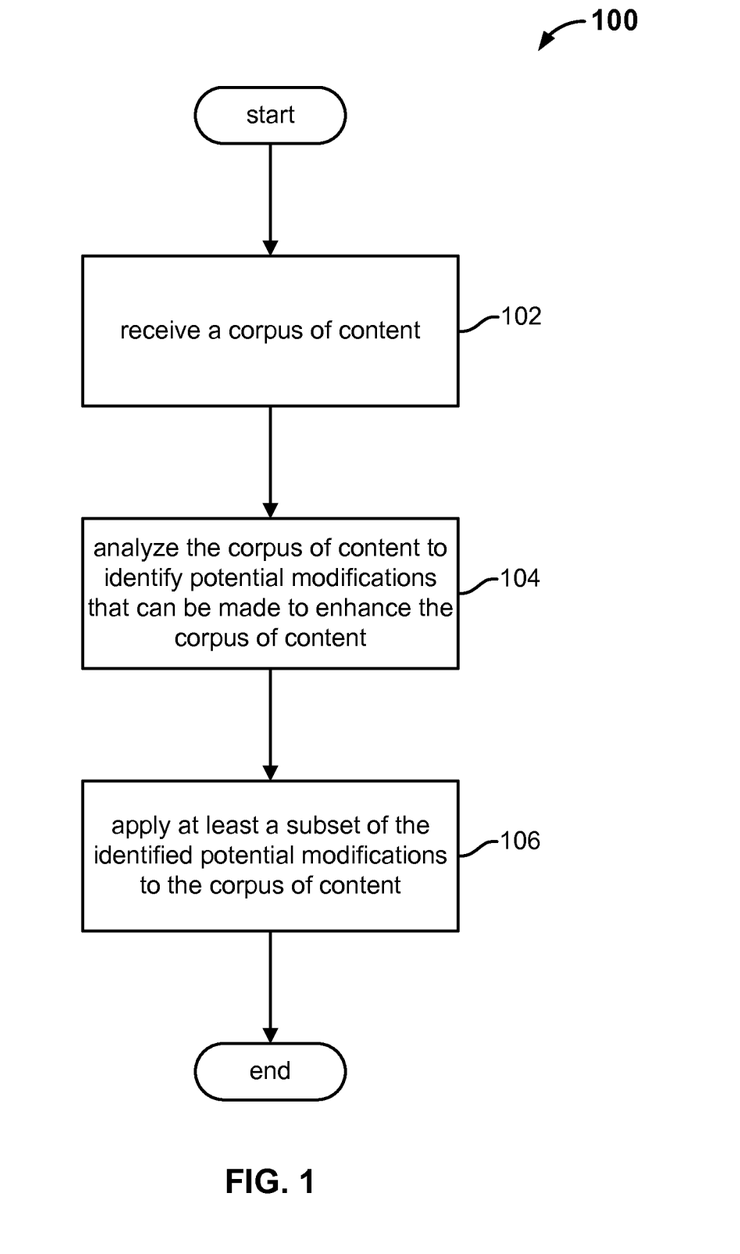
FIG. 1 illustrates an embodiment of a process for enhancing the content and/or structure of a corpus of content.

FIG. 1 illustrates an embodiment of a process for enhancing the content and/or structure of a corpus of content. In some embodiments, process 100 is employed to provide enhanced or richer content and/or navigation of content for use by users, search engines, vertical search engines, social channels, etc. In various embodiments, process 100 may comprise a web service or an integrated functionality or tool, e.g., of a website, and may be performed online or offline. Process 100 may be performed as often as desired or may be performed on a regular or ongoing basis to enhance the content and/or structure of a website or other body of content incrementally and/or periodically over time. In some embodiments, process 100 systematically facilitates increased traffic to a website due to a more optimized presentation of content and organization of the website. Process 100 starts at 102 at which a corpus of content is received. The corpus of content received at 102 may, for example, comprise a website or web page whose content and/or structure is desired to be optimized or at least improved. At 104, the corpus of content received at 102 is analyzed to identify potential modifications that can be made to enhance the corpus of content. Techniques for analyzing the corpus of content or parts thereof as well as identifying content that should appear in the corpus of content or parts thereof are described in further detail below. Such content that should appear may be compared to existing content to identify potential modifications at 104. In various embodiments, the potential modifications identified at 104 may include altering existing content (e.g., reorganizing, replacing, or otherwise adjusting existing content and/or the presentation of content), adding new content (e.g., synonyms or other interchangeable expressions for important terms, links to other pages or resources, etc.), smearing content from any appropriate source (e.g., adding content to a page that is extracted from a related and/or relevant source), surfacing content that was previously not static and hence not searchable or crawlable, moving content (e.g., from one portion of a page to another portion of the page or from one page of a website to another page of the website), deleting or removing content (e.g., to reduce excessive duplication or that is not or is no longer relevant to a page), etc. Modifications may be identified at 104 for the main body of content of a page as well as for content comprising other parts of a page such as metadata, titles, section headings, captions, tags, anchor text, etc. In some embodiments, a corpus of content may be globally analyzed at 104 to identify modifications for optimizing content. For example, as a result of a global analysis of the content of a website, specific content that should appear on each of at least a subset of pages of the website to improve crawlability and ranking of the website and associated web pages may be identified. In some embodiments, portions of a corpus of content may be sequentially analyzed at 104. For example, pages of a website that are linked together may be sequentially analyzed, e.g., according to the page hierarchy of the website. In some embodiments, the analysis of 104 includes identifying modifications to off-page content associated with a page, such as the anchor text of links to the page, the placement of links to the page on other pages, the presentation of links to the page on other pages, etc. At 106, at least a subset of the potential modifications identified at 104 is applied to the corpus of content or parts thereof, and process 100 subsequently ends. In some embodiments, modifications are integrated in a manner or format that allows the resulting content to be crawled. For example, added content may be loaded directly into the HTML (HyperText Markup Language) of a page. In various embodiments, added content may be presented in any appropriate manner, including inline with previously existing content and/or separately via one more dedicated widgets.

Figure 2:
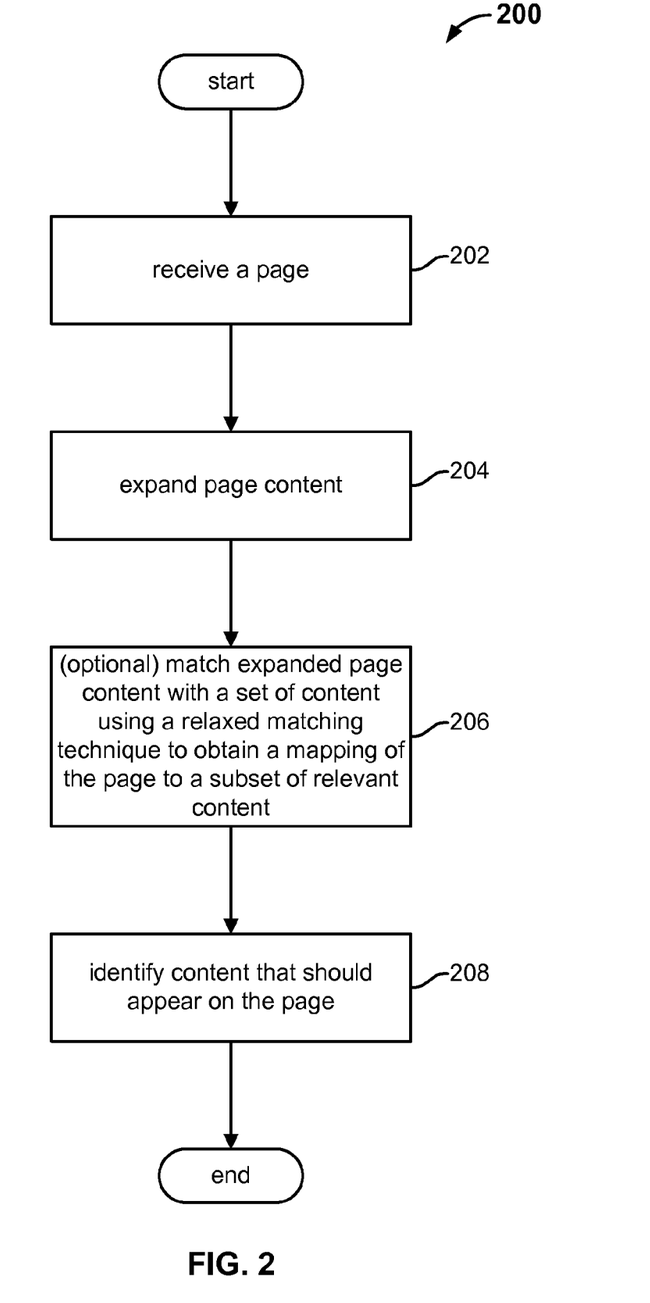
FIG. 2 illustrates an embodiment of a process for identifying content that should appear on a page.

FIG. 2 illustrates an embodiment of a process for identifying content that should appear on a page. In some embodiments, process 200 is employed at 104 of process 100 of FIG. 1. In some embodiments, process 200 is employed to identify missing content. In some such cases, adding at least some of the missing content identified using process 200 to a page would result in the page being more amenable to searches due to richer content appearing on the page. Process 200 starts at 202 at which a page is received. For example, the received page may comprise a page of a website. At 204, the content of the page received at 202 is expanded. In some embodiments, the content expansion of step 204 is performed to identify additional related and/or relevant content but at least at the stage of step 204 is not employed to alter the existing content of the page as received at 202, although in subsequent steps (e.g., step 106 of process 100) at least some of the additional content identified at step 204 may be employed to actually modify the page. Any one or more content expansion techniques and/or tools known in the art may be employed to expand the content of the page at 204. The content expansion of 204 may include, for example, identifying synonyms, colloquial variations, spelling variations, geographical variations, or any other substitutable terms for at least a relevant subset of the existing content of the page. In some cases, the content expansion of 204 includes identifying substitutions for anchor text, for example, by identifying and treating the anchor text of hyperlinks that point to the same page as synonyms. Various well-known resources may be employed to aid in identifying substitutable terms at 204, such as dictionaries, thesauruses, other lexical databases (e.g., WordNet), search term or query databases (e.g., search engine logs and search logs from websites), etc. Furthermore, a given language and/or common sentences and phrases of a given language may be mined to isolate substitutable terms or expressions. In some embodiments, the content expansion of 204 includes identifying term co-occurrences (i.e., terms that are frequently used together or within a prescribed vicinity of one another), for example, from language mining and/or from well known corpuses such as Wikipedia, NIST (National Institute of Standards and Technology) corpuses, etc.

At 206, the expanded content is optionally matched against a set of content using a relaxed matching technique to obtain a mapping of the page to a subset of relevant content. The set of content may include any queries, terms, keywords, phrases, expressions, or other identifiers used to index and/or locate a resource such as a web page. In various embodiments, a set of queries employed at 206 may be populated, for example, using any applicable reverse search engine and/or from any other appropriate sources such as search engine logs, search logs from websites, search terms extracted from traffic logs, manually authored queries or search terms, etc. Any appropriate metrics for relaxed matching may be employed at 206. In some embodiments, relaxed matching includes considering a query a match even when only a subset of terms comprising the query is present. For example, a query comprising five terms may be deemed a match even if only one of the five terms comprising the query is present in the expanded content. In some embodiments, relaxed matching includes considering a query a match even when one or more terms comprising the query are found more than a prescribed distance apart, i.e., even if one or more terms comprising the query are not found together or close together.

For example, a query comprising two terms may be deemed a match even if the two terms comprising the query are found in different paragraphs or sections of a page. In some embodiments, relaxed matching includes considering a query a match if the query is semantically related to other content that is considered a match. For example, a query may be deemed a match even if none of the terms comprising the query are present in the expanded content but if the query is semantically related to another query or other content that is a match. Relaxed matching may also be performed with respect to other types or sources of content such as topics or other semantic categorizations of content. Using relaxed matching techniques allows a larger subset of relevant content to be identified for a page.

At 208, content that should appear on the page, e.g., to improve its searchability, is identified, and process 200 subsequently ends. In some embodiments, the content identified at 208 includes at least a subset of the expanded content determined at 204. In some embodiments, content that is missing from the page that should appear on the page is identified at 208. In some cases, missing content is identified at 208 at least in part by comparing the subset of relevant content determined at 206 to the existing content of the page (e.g., as received at 202, which does not include the expanded content for the page as determined at 204) and identifying content included in the subset of relevant content that is not present in the page. If added to the page, such missing content would, for example, augment the query set for which the page would be a hit. In some embodiments, at least some of the content identified at 208 may be employed, e.g., at 106 of process 100, to alter existing content, for example, if such an alteration provides more relevant content and/or presentation of content on the page. In some embodiments, content may be removed or deleted from a page, e.g. at 106 of process 100, if it is not identified as content that should appear on the page at 208. In some embodiments, existing content of a page that has been identified at 208 as content that should appear on the page may at least in part be removed or deleted, e.g., at 106 of process 100, for deduplication purposes. Although described with respect to a page, process 200 may be employed for a website or any other organization of content in other embodiments.

Figure 3:
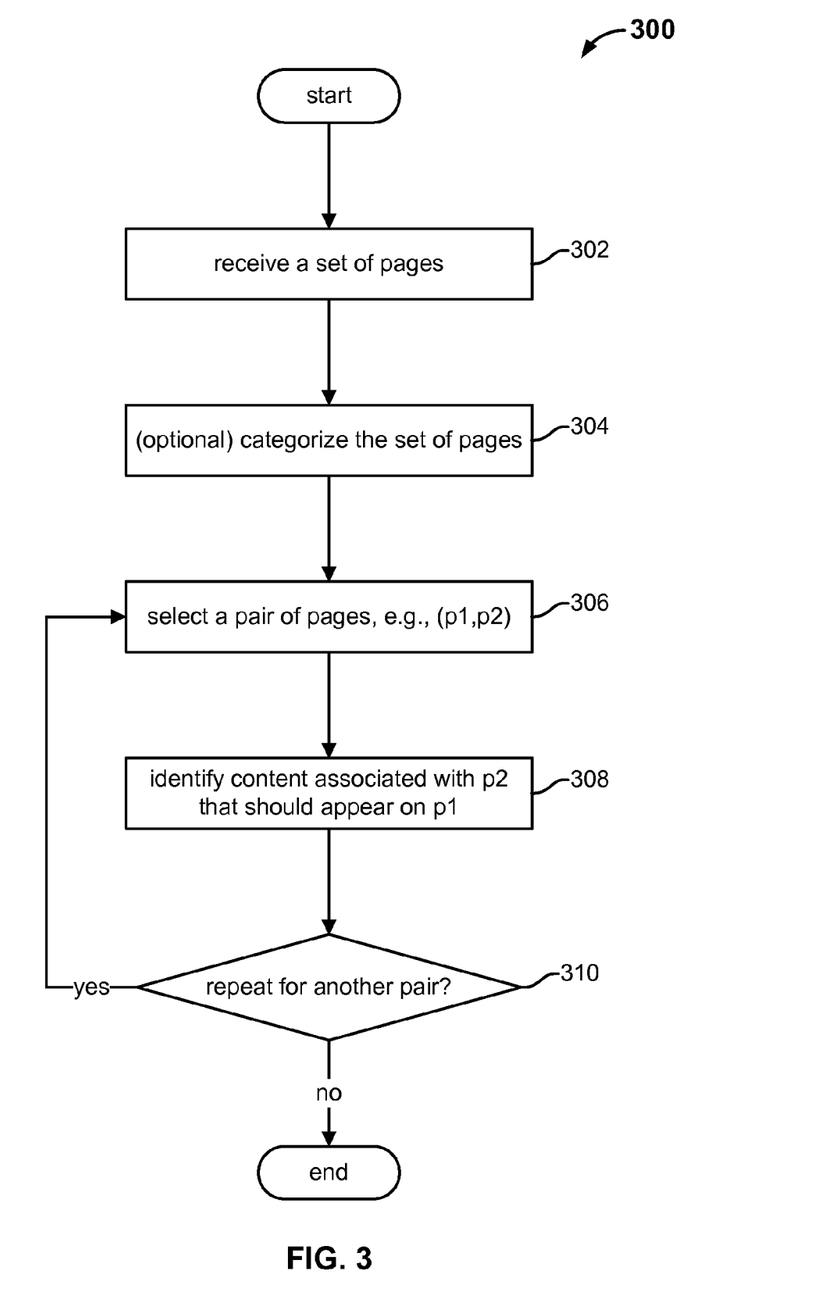
FIG. 3 illustrates an embodiment of a process for identifying content that should appear on a page.

FIG. 3 illustrates an embodiment of a process for identifying content that should appear on a page. In some embodiments, process 300 is employed at 104 of process 100 of FIG. 1. In some embodiments, process 300 is employed to optimize or at least enhance the content and/or structure of a website. Although described with respect to a set of pages and optimizing the content between pairs of pages, process 300 may be similarly employed with respect to any other organizations of content and/or to globally optimize a corpus of content. For example, in some embodiments, p1 in the given example may refer to a page and p2 may refer to a set of pages, a website, or another body of content instead of another page as described in the given example. Process 300 starts at 302 at which a set of pages is received. In some embodiments, the set of pages comprises pages of a website. In some embodiments, the set of pages includes pages from different sources, such as different but possibly related or otherwise mutually relevant websites or other content sources. At 304, the set of pages is optionally categorized based on one or more metrics. In various embodiments, pages may be categorized based on metrics such as crawl frequency, frequency of page views, user browsing behavior, number of inlinks to a page, number of external links from a page, etc., and prescribed thresholds associated with such metrics. For example, in some embodiments, a page is categorized as a hub page if it has been crawled at least a prescribed number of unique days within a month and is categorized as a deep page otherwise. In other embodiments, pages may be categorized as hub or deep pages or other categorizations based on any other criteria and/or thresholds. At 306, a pair of pages (i.e., a first page p1 and a second page p2) from the set of pages is selected. In some embodiments, p1 comprises a hub page and p2 comprises a deep page, for example, of a website. In other embodiments, the pair of pages may comprise pages of any other categorizations and/or may be from different websites or sources. At 308, content associated with (deep page) p2 that should appear on (hub page) p1 is identified. In some embodiments, step 308 includes identifying ways to smear content from p2 onto p1. In some cases, the content identified at 308 comprises a snippet, summary, or paragraph of content of p2. In some cases, the content identified at 308 comprises a link to p2 and/or relevant anchor text for such a link. In some embodiments, the content identified at 308 may be employed to identify existing content of p1 that should be altered and/or removed, e.g., at 106 of process 100. For example, at least some of the content identified at 308 that already appears on p1 might be removed for deduplication purposes, and/or content associated with p2 that is not identified at 308 but that already exists on p1 may be altered and/or deleted from p1. At 310, it is determined whether to repeat step 308 for another pair of pages of the set of pages received at 302. If it is determined at 310 to continue process 300 with another pair of pages, process 300 continues from 306 at which another pair of pages is selected. If it is determined at 310 not to continue with another pair of pages and/or if all possible pairs have already been considered during previous iterations, process 300 ends.

Figure 4:
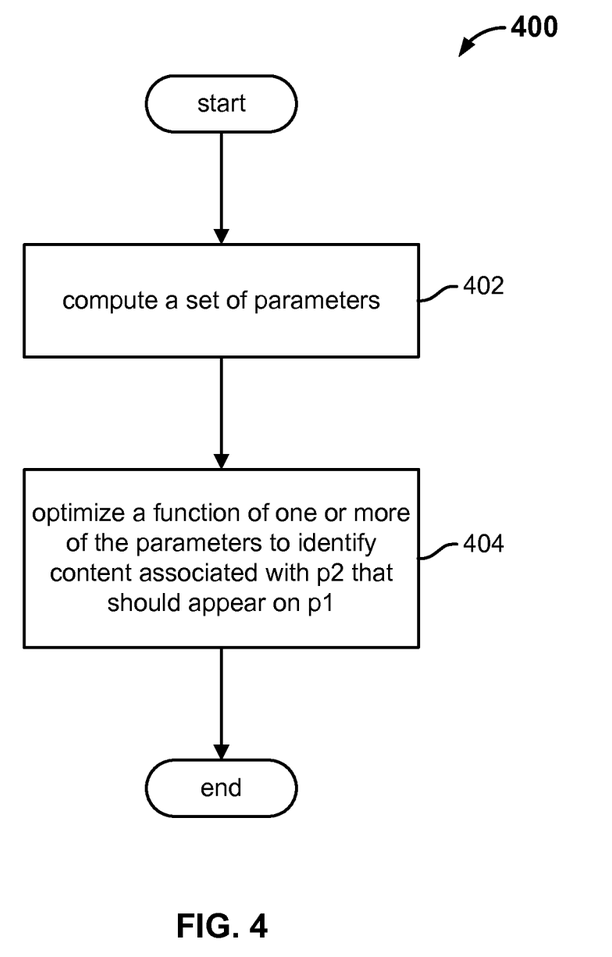
FIG. 4 illustrates an embodiment of a process for identifying content that should appear on a page.

FIG. 4 illustrates an embodiment of a process for identifying content that should appear on a page. Although described with respect to a pair of pages, process 400 may be similarly employed with respect to a pairing of any other organization of content. For example, in some embodiments, p1 in the given example may refer to a page and p2 may refer to a set of pages, a website, or another body of content instead of another page as described in the given example. In some embodiments, process 400 is employed at 308 of process 300 of FIG. 3. In some embodiments, process 400 is employed to identify content associated with (deep page) p2 that should be appear on (hub page) p1. Process 400 starts at 402 at which a set of one or more parameters are computed, for example, for a pair of pages (p1, p2). In some embodiments, the set of parameters includes a link weight that quantifies the desirability or suitability of a link existing between a pair of pages based on metrics such as existing crawl frequencies of the pages, viewing frequencies of the pages, browsing habits associated with the pages, etc. For instance, if p1 is highly crawled but p2 is not as determined from the crawl frequencies of the pages, it may be desirable to link p1 to p2, which may, for example, be reflected by a higher link weight for the pair of pages. In some embodiments, the set of parameters includes a content weight that quantifies the desirability or suitability of there being content on a page (p1) that has been obtained from another page (p2). The content weight may be based on a metric such as the number of unique terms already present on p2 that have been targeted to appear on p1, e.g., using process 200. Based on the content weight, a portion of p2 that includes the most number of terms that have been targeted to appear on p1 may be identified to be included in p1. For instance, if terms x, y, and z have been identified as target terms to appear on p1 (e.g., using process 200) and if p2 already includes terms x and y, it may be desirable to add a snippet of text or a paragraph that includes terms x and y extracted from p2 to p1, which may, for example, be reflected by a higher content weight for the pair of pages. In some embodiments, the set of parameters includes a relation weight that quantifies the relatedness and/or mutual relevance of a pair of pages as well as the suitability of content and/or a link being shared between the pair of pages. The relation weight may be based on metrics such as similarity of the content and/or categorization of the pages, desired browsing habits for the pages, desired crawl patterns for the pages, etc. Although some examples have been described, the set of parameters computed at 402 may include any other appropriate weights or parameters.

At 404, a function of one or more of the parameters determined at 402 is optimized to identify content associated with p2 that should appear on p1, and process 400 subsequently ends. In some embodiments, process 400 includes generating a graph, for example, that represents the structure of a website, and the function of step 404 is associated with an edge of such a graph. In some embodiments, the function of step 404 is optimized based on a set of one or more constraints. In some embodiments, the set of constraints includes constraints based on browsing or usage patterns and/or promotion requirements of an associated website. In some embodiments, the set of constraints includes constraints on the content and/or types of content that can be supported by a page (p1). For example, in some cases, the set of constraints includes a maximum number of outlinks from a page (p1) and/or a minimum number of inlinks to a page (p1), each of which may be a user selectable value selected by, for instance, a website owner or designer. The output of optimizing the function indicates content associated with p2 that should appear on p1. In various embodiments, the result of optimizing the function may indicate to add a link from p1 to p2, add content to p1 from p2, or both. The anchor text of a link to p2 and/or content extracted from p2 to be added to p1 may be selected in a manner that maximizes inclusion of missing content identified for p1, e.g., using process 200. Any appropriate techniques known in the art may be employed to extract content and/or generate a snippet from p2. In some embodiments, the result of optimizing the function may indicate that certain content associated with p2 and/or a link from p1 to p2 should not appear on p1. In these cases, such existing content from p2 on p1 and/or an existing link from p1 to p2 may be flagged for removal and may be removed from p1 or altered, e.g., at 106 of process 100.

In general, one or more of the described techniques may be employed to enhance the content and/or structure of a website or other corpus of content. Starting with the existing content and link structure of a website, modifications to the website that make the pages of the website and the overall website more discoverable, searchable, crawlable, and/or amendable to other third party services are identified. For example, process 200 may be employed to identify missing content or terms that can be added to a page, e.g., as text or anchor text; and processes 300 and/or 400 may be employed to identify content that should be smeared between pages of a website and/or manners in which the link structure of a website can be improved. The selection of content to appear on a page may be based on one or more parameters and/or constraints. Moreover, content added to a page may be selected such that it encompass the missing content identified for the page using process 200 to the extent possible. The content and/or links identified for a page via one or more of processes 200-400 may be employed to modify the page at 106 of process 100, e.g., by the addition of such identified content to the page and/or alteration or removal of existing content of the page, resulting in improved page content and/or structure of an associated website. The described processes for identifying content that should appear on a page may be performed sequentially, e.g., for individual pages or pairs of pages (p1, p2). Alternatively, the described processes may be similarly performed globally and/or possibly in a non-sequential manner. For example, content may be identified based on a global analysis of a website and placed on every page of the website. Such a global optimization may be useful for improving crawlability and ranking in search results. Furthermore, the described processes for identifying content may be employed for off-page optimization of content associated with a page, such as anchor text optimization as well optimization of the placement and/or presentation of links to the page on other pages.

Figure 5:
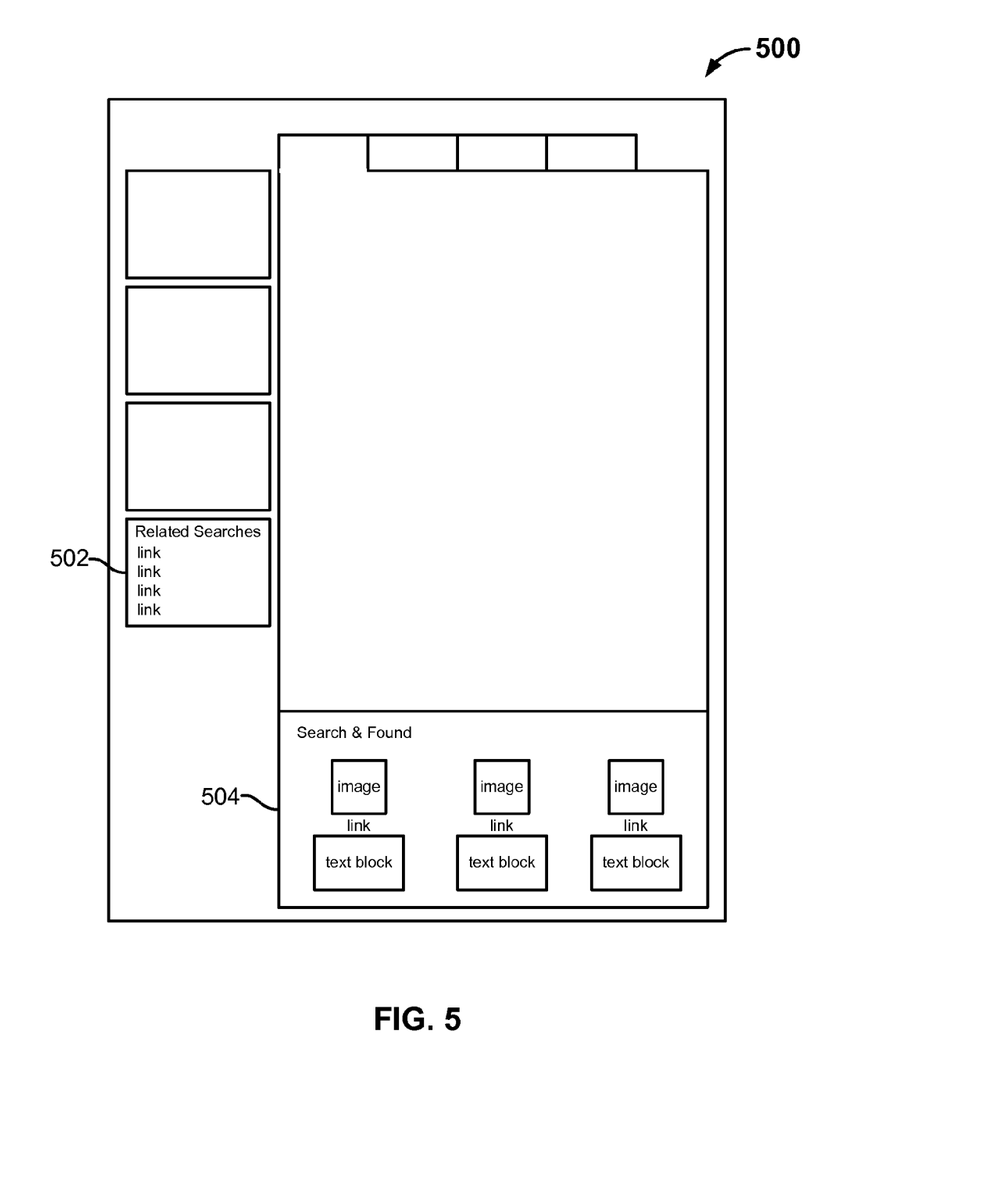
FIG. 5 illustrates an embodiment of a page that includes widgets that are populated with content identified using the disclosed techniques.

In various embodiments, content (including links) may be published on a page in any appropriate manner, including inline with previously existing content and/or separately via one or more dedicated widgets. FIG. 5 illustrates an embodiment of a page 500 that includes widgets 502 and 504 that are populated with content identified using the disclosed techniques. In some embodiments, widgets 502 and 504 are dynamically populated. "Related Searches" widget 502 is populated with links that point to other pages, e.g., of an associated website. "Search & Found" widget 504 is populated with images (which may comprise links), links, and text blocks. In various embodiments, the images, anchor text of links, and/or text blocks of widget 504 may be extracted from other pages, e.g., of an associated website. For instance, the text blocks may comprise snippets generated from other pages. The anchor text of links and/or the text included in the text blocks of widgets 502 and 504 may be selected in a manner to maximize inclusion of missing content identified, for example, using process 200. The example of FIG. 5 illustrates one technique for surfacing content on a page. In other embodiments, content may be added to a page in any other appropriate manner. In some embodiments, added content is integrated in a manner or format that allows the content to be crawled. For example, added content may be loaded directly into the HTML of a page.

In some embodiments, optimization tools and/or services to automatically enhance the content and/or structure of a website are provided by a third party provider. In various embodiments, website optimization may be performed as desired or incrementally and/or periodically so that the website is continued to be optimized as it evolves. Optimization may be performed as an offline and/or online service. In some cases, for example, it may be desirable to optimize a website offline prior to it initially going live. In some embodiments, optimization of a website or of a page of the website is dynamically performed in real time. For instance, a request for optimization may be received by the third party provider from a web server of a website for each client request for a page received by the web server so that, for example, a requested page with more relevant content can be served to the client. Furthermore, optimization may be performed as a push and/or pull service. In some embodiments, modifications to a website may be pushed to a web server of the website by the third party provider, for example, via email. In some embodiments, a content optimization tool or module of code (e.g., that is provided by the third party provider) may be directly integrated into a website and may be invoked each time a page is requested. In some embodiments, widgets 502 and/or 504 of a page 500 may be dynamically populated via a remote API (Application Program Interface) call or other data delivery mechanism.

Figure 6:
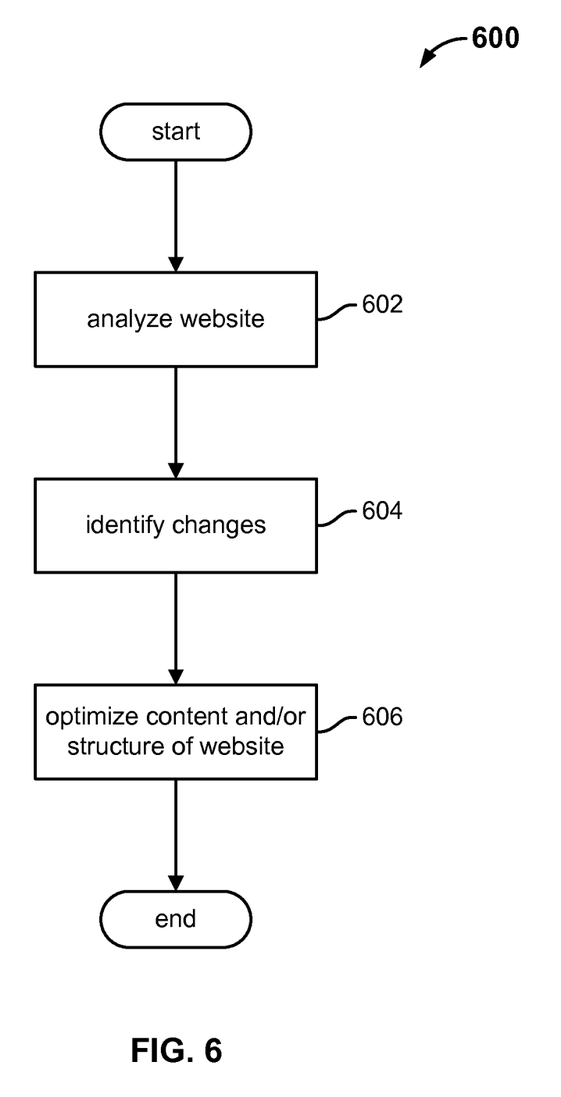
FIG. 6 illustrates an embodiment of a process for optimizing a website.

A website may be dynamically and automatically optimized in a recurring or on-going fashion. FIG. 6 illustrates an embodiment of a process for optimizing a website. Process 600 may be employed by a tool or service that automatically optimizes or at least enhances the content and/or structure of a website. In various embodiments, process 600 may be iterated as desired, periodically, for each client request for a page of the website, etc. Process 600 starts at 602 at which a website is analyzed. In some embodiments, step 602 includes crawling the website. In some embodiments, step 602 includes collecting analytics data associated with the website, such as crawl data, visit and/or browsing data, pixel analytics, etc. In some cases, analytics data may at least in part be collected from an integrated widget such as widgets 502 and/or 504, e.g., via JavaScript. At 604, changes to the website, e.g., from a last optimization of the website, are identified. In various embodiments, the changes may include changes to the content and/or structure of the website as well as changes in the analytics data associated with the website, i.e., the data collected at 602. At 606, the content and/or structure of the website are optimized using the disclosed techniques based on, for example, the data collected at 602 and/or the changes identified at 604. Process 600 subsequently ends. Optimizing at 606 may include adding, changing, and/or removing content (including links) in order to provide pages with more relevant content. Although described for a website, process 600 may be employed for a web page or other organization of content in other embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for enhancing content, comprising:
   receiving a website comprising a plurality of pages;
   categorizing a page of the website that satisfies a threshold crawl frequency as a hub page and a page that does not satisfy the threshold crawl frequency as a deep page;
   automatically identifying a set of relevant content associated with a given hub page including by:
     expanding content of the hub page by identifying substitutable terms and expressions for existing content of the hub page,
     matching the expanded content of the hub page with a set of search properties, and
     including in the set of relevant content at least a portion of the expanded content that matches the set of search properties based on a relaxed matching in which a match is considered satisfied when at least a partial or semantic match is identified, that is already present on one or more deep pages of the website, and that does not already appear in the existing content of the hub page; and
   automatically applying a set of modifications to the given hub page to incorporate at least a subset of the identified set of relevant content into the hub page including publishing at least some of the relevant content via a dynamic widget integrated in the hub page.

2. A method as recited in claim 1, wherein the set of modifications comprises one or more alterations to the existing content of the hub page.

3. A method as recited in claim 1, wherein the set of modifications comprises removal of one or more portions of the existing content of the hub page.

4. A method as recited in claim 1, wherein the set of modifications comprises addition of one or more portions of content to the hub page.

5. A method as recited in claim 1, wherein automatically identifying a set of relevant content and automatically applying a set of modifications to the hub page are performed periodically.

6. A method as recited in claim 1, wherein the set of relevant content comprises substitutable terms or expressions for existing content of the hub page.

7. A method as recited in claim 1, wherein the set of relevant content comprises relevant queries associated with the hub page.

8. A method as recited in claim 1, wherein automatically identifying the set of relevant content further comprises:
   extracting content from a related page or a content source having related content; and
   including the extracted content in the set of relevant content.

9. A method as recited in claim 8, wherein the extracted content is not already included in the existing content of the hub page.

10. A method as recited in claim 1, wherein the set of relevant content further comprises a snippet of text generated from another page or content source.

11. A method as recited in claim 1, wherein the set of relevant content further comprises a link to another page or resource.

12. A method as recited in claim 1, wherein automatically identifying the set of relevant content further comprises:
   computing a set of one or more parameters with respect to the hub page and a deep page;
   optimizing a function of the set of parameters based on a set of one or more constraints to identify content associated with the deep page that is relevant to the hub page; and
   including at least some of the content associated with the deep page identified by the optimization in the set of relevant content.

13. A method as recited in claim 1, further comprising publishing at least a subset of the relevant content as anchor text of a link to the hub page in another page.

14. A method as recited in claim 1, wherein automatically applying a set of modifications to the hub page comprises publishing at least a subset of the relevant content as anchor text of a link to another page or resource.

15. A method as recited in claim 1, wherein the set of search properties comprises one or more search terms or queries.

16. A method as recited in claim 1, wherein the set of relevant content is identified for the website and at least a subset of the set of modifications is applied to at least a subset of pages comprising the website.

17. A system for enhancing content, comprising:
   a processor configured to:
     receive a website comprising a plurality of pages;
     categorize a page of the website that satisfies a threshold crawl frequency as a hub page and a page that does not satisfy the threshold crawl frequency as a deep page;
     automatically identify a set of relevant content associated with a given hub page including by:
       expanding content of the hub page by identifying substitutable terms and expressions for existing content of the hub page,
       matching the expanded content of the hub page with a set of search properties, and
       including in the set of relevant content at least a portion of the expanded content that matches the set of search properties based on a relaxed matching in which a match is considered satisfied when at least a partial or semantic match is identified, that is already present on one or more deep pages of the website, and that does not already appear in the existing content of the hub page; and
automatically apply a set of modifications to the given hub page to incorporate at least a subset of the identified set of relevant content into the hub page including publishing at least some of the relevant content via a dynamic widget integrated in the hub page; and
a memory coupled to the processor and configured to provide instructions to the processor.

18. A system as recited in claim 17, wherein the set of modifications comprises one or more alterations to the existing content of the hub page.

19. A system as recited in claim 17, wherein the set of modifications comprises removal of one or more portions of the existing content of the hub page.

20. A system as recited in claim 17, wherein the set of modifications comprises addition of one or more portions of content to the hub page.

21. A system as recited in claim 17, wherein the processor is configured to automatically identify a set of relevant content and automatically apply a set of modifications to the hub page periodically.

22. A system as recited in claim 17, wherein the set of relevant content comprises substitutable terms or expressions for existing content of the hub page.

23. A system as recited in claim 17, wherein the set of relevant content comprises relevant queries associated with the hub page.

24. A system as recited in claim 17, wherein to automatically identify the set of relevant content further comprises:
extracting content from a related page or a content source having related content; and
including the extracted content in the set of relevant content.

25. A system as recited in claim 24, wherein the extracted content is not already included in the existing content of the hub page.

26. A system as recited in claim 17, wherein the set of relevant content further comprises a snippet of text generated from another page or content source.

27. A system as recited in claim 17, wherein the set of relevant content further comprises a link to another page or resource.

28. A system as recited in claim 17, wherein to automatically identify the set of relevant content further comprises:
computing a set of one or more parameters with respect to the hub page and a deep page;
optimizing a function of the set of parameters based on a set of one or more constraints to identify content associated with the deep page that is relevant to the hub page; and
including at least some of the content associated with the deep page identified by the optimization in the set of relevant content.

29. A system as recited in claim 17, wherein the processor is further configured to publish at least a subset of the relevant content as anchor text of a link to the hub page in another page.

30. A system as recited in claim 17, wherein to automatically apply a set of modifications to the hub page comprises to publish at least a subset of the relevant content as anchor text of a link to another page or resource.

31. A system as recited in claim 17, wherein the set of search properties comprises one or more search terms or queries.

32. A system as recited in claim 17, wherein the set of relevant content is identified for the website and at least a subset of the set of modifications is applied to at least a subset of pages comprising the website.

33. A computer program product for enhancing content, the computer program product being embodied in a non-transitory computer readable storage medium and comprising computer instructions for:
receiving a website comprising a plurality of pages;
categorizing a page of the website that satisfies a threshold crawl frequency as a hub page and a page that does not satisfy the threshold crawl frequency as a deep page;
automatically identifying a set of relevant content associated with a given hub page including by:
expanding content of the hub page by identifying substitutable terms and expressions for existing content of the hub page,
matching the expanded content of the hub page with a set of search properties, and
including in the set of relevant content at least a portion of the expanded content that matches the set of search properties based on a relaxed matching in which a match is considered satisfied when at least a partial or semantic match is identified, that is already present on one or more deep pages of the website, and that does not already appear in the existing content of the hub page; and
automatically applying a set of modifications to the given hub page to incorporate at least a subset of the identified set of relevant content into the hub page including publishing at least some of the relevant content via a dynamic widget integrated in the hub page.

34. A computer program product as recited in claim 33, wherein the set of modifications comprises one or more alterations to the existing content of the hub page.

35. A computer program product as recited in claim 33, wherein the set of modifications comprises removal of one or more portions of the existing content of the hub page.

36. A computer program product as recited in claim 33, wherein the set of modifications comprises addition of one or more portions of content to the hub page.

37. A computer program product as recited in claim 33, wherein automatically identifying a set of relevant content and automatically applying a set of modifications to the hub page are performed periodically.

38. A computer program product as recited in claim 33, wherein the set of relevant content comprises substitutable terms or expressions for existing content of the hub page.

39. A computer program product as recited in claim 33, wherein the set of relevant content comprises relevant queries associated with the hub page.

40. A computer program product as recited in claim 33, wherein automatically identifying the set of relevant content further comprises:
extracting content from a related page or a content source having related content; and
including the extracted content in the set of relevant content.

41. A computer program product as recited in claim 33, wherein the set of relevant content further comprises a snippet of text generated from another page or content source.

42. A computer program product as recited in claim 33, wherein the set of relevant content further comprises a link to another page or resource.

43. A computer program product as recited in claim 33, wherein automatically identifying the set of relevant content further comprises:
computing a set of one or more parameters with respect to the hub page and a deep page;

optimizing a function of the set of parameters based on a set of one or more constraints to identify content associated with the deep page that is relevant to the hub page; and including at least some of the content associated with the deep page identified by the optimization in the set of relevant content.

44. A computer program product as recited in claim 33, further comprising computer instructions for publishing at least a subset of the relevant content as anchor text of a link to the hub page in another page.

45. A computer program product as recited in claim 33, wherein automatically applying a set of modifications to the hub page comprises publishing at least a subset of the relevant content as anchor text of a link to another page or resource.

46. A computer program product as recited in claim 33, wherein the set of search properties comprises one or more search terms or queries.

47. A computer program product as recited in claim 33, wherein the set of relevant content is identified for the website and at least a subset of the set of modifications is applied to at least a subset of pages comprising the website.

\* \* \* \* \*